April 21, 1970     D. S. CHISHOLM     3,507,735
METHOD AND APPARATUS FOR MAKING REINFORCED JOINTS IN
THERMOPLASTIC FOAMS
Filed July 22, 1966
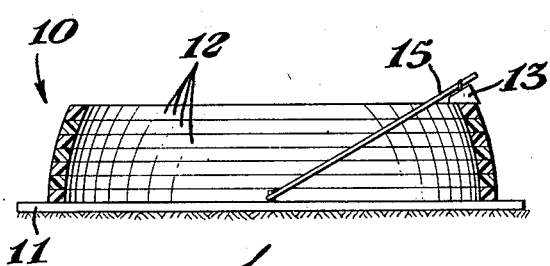
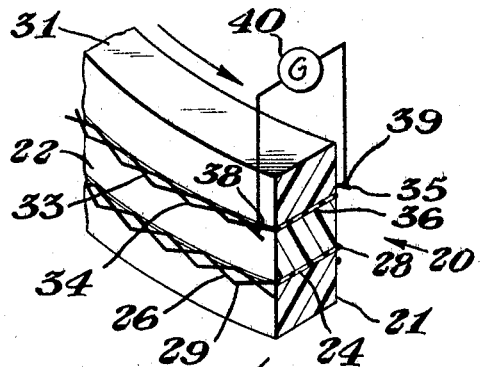
INVENTOR.
Douglas S. Chisholm
BY
AGENT

United States Patent Office 3,507,735
Patented Apr. 21, 1970

3,507,735
METHOD AND APPARATUS FOR MAKING REINFORCED JOINTS IN THERMOPLASTIC FOAMS
Douglas S. Chisholm, Midland, Mich., assignor to The Dow Chemical Company, Midland, Mich., a corporation of Delaware
Filed July 22, 1966, Ser. No. 567,169
Int. Cl. B29d 9/02
U.S. Cl. 156—380                                         6 Claims

ABSTRACT OF THE DISCLOSURE

In a spiral generation process wherein strips of foam are deposited one upon the other, an improved bond is obtained between the adjacent strips by providing a metal insert into adjacent portions of foam, electrically heating the metal insert to cause melting and fusion of the foam.

---

This invention relates to a method and apparatus for making reinforced joints or fusion welds in thermoplastic foams, and more particularly relates to a method and apparatus for the installation of a reinforcing mesh between foam layers.

Advantageously, walled structures and other articles are prepared from plastic foams by fusion welding strips or planks of plastic foam to each other to form a unitary structure. It is also known to incorporate reinforcing elements such as wire and mesh within such joints in order to provide reinforcement. U.S. Letters Patent 3,206,899 describes apparatus for the fabrication of structures from foamed plastic structures. Frequently, when incorporating metal reinforcement within a joint between foamed elements, difficulty is encountered in obtaining uniform heating of both the foam and the reinforcement. Many synthetic resinous thermoplastic foams must be joined together employing a heat input which must be closely controlled in order to avoid overheating or underheating of the foam. Overheating the foam results in collapse of the cell walls and undesired shrinkage, whereas underheating the foam results in either an ineffective joint or no joint.

It would be advantageous if there were available an improved method and apparatus for the incorporation of metallic reinforcing elements between adjacent strips of foamed plastic.

It would also be advantageous if there were available an improved method and apparatus which permitted close control of the heat input to the metallic element and permitted independent heating thereof.

It would also be advantageous if there were available an apparatus for the heating of a metallic reinforcing element within a joint between two foam plastic bodies.

These benefits and other advantages in accordance with the present invention are achieved in an apparatus for the joining of synthetic resinous bodies which comprises a foam depositing head such as is shown in U.S. Letters Patent 3,206,899, the foam depositing head having means to engage a formed foam structure, means to engage a foam strip being deposited on the formed structure, means to forward the foam depositing head at a predetermined rate, the improvement which comprises an electric heating means in operative association with the foam depositing head, the electric heating means adapted to heat a metallic element projecting on either side of the foam strip being deposited, means to provide electric power to the heating element to thereby heat the metallic element and cause partial melting and fusion of the foam.

Also contemplated within the scope of the present invention is a method for the fabrication of foam plastic articles from adjacent strips having a metallic reinforcing element disposed therebetween, the steps of the method comprising providing first and second foamed synthetic resinous thermoplastic elements, disposing the elements in a desired face to face relationship, disposing a perforate metal reinforcing element between the elements to be joined, the reinforcing element being of sufficient size to project outwardly on either side of the joint being formed, causing an electrical current to flow within the reinforcing element, the electrical current having sufficient magnitude to heat the reinforcing element and melt a portion of the foam plastic material, the electrical current being applied in a continuous manner and at a predetermined rate along the length of the reinforcing element.

Further features and advantages of the present invention will become more apparent from the following specification when taken in connection with the drawing wherein:

FIGURE 1 schematically depicts the preparation of a structure employing the method and apparatus of the invention.

FIGURE 2 is a schematic cut away representation of foamed plastic elements being joined in accordance with the present invention.

FIGURE 3 is an end view of a contact assembly employed in the present invention.

FIGURE 4 is a schematic side view of the apparatus in accordance with the invention joining foamed bodies.

FIGURES 5 and 6 are schematic representations of alternate methods of heating the reinforcing element.

In FIGURE 1, there is schematically illustrated a structure 10 supported on the base 11. The structure 10 is formed from a plurality of foamed plastic strips 12. The strips 12 are deposited by means of a foam depositing head 13 supported on a rotatable boom 15. Each of the strips 12 has disposed therebetween a metal reinforcement.

In FIGURE 2 there is illustrated a schematic representation of the joining of plastic strips in accordance with the invention. In FIGURE 2 there is depicted a foamed structure 20. The structure 20 comprises a first foam plastic strip 21 and a second foam strip 22. A joint 24 is formed between the strips 21 and 22. A perforate metal reinforcing element 26 extends laterally across the joint 24. Beneficially, the reinforcing element 26 is fabricated from expanded metal mesh, wire mesh or the like having openings sufficiently large for molten polymer to pass therethrough. The mesh 26 is an elongate strip having a first edge 28 and a second edge 29. The edge or edge portions 28 and 29 extend laterally beyond the foam strips 21 and 22 and as illustrated in FIGURE 2 have been folded to be generally parallel to the surfaces of the structure 20 adjacent the foam strips. A third foam strip 31 is disposed adjacent the foam strip 22 and is being joined to the strip 22 to form a portion of the structure 20. An elongate perforate sheet-like reinforcing element 33 is disposed between the strip 31 and the strip 22. The element 33 has a first edge 34 and a second edge 35 projecting outwardly from a joint 36 between the strip 31 and the strip 32. A first movable electrical contact 38 is in contact with the first edge 34 and the second contact 39 is in contact with the edge 35 to provide an electrical path from the first contact to the second contact to the reinforcing element 33. An electrical power source 40 is in operative connection with the contacts 38 and 39. The contacts 38 and 39 are continuously moved at a predetermined rate in a direction indicated by the arrow which is along the length of the strip 31 applying an electrical current of sufficient magnitude to cause the temperature of the portion of the strip lying between the contacts 38 and 39 to raise the temperature and melt and bond the foam of the strips 31 and 22 to a desired degree.

Thus, in the operation of the method of the invention as set forth in FIGURE 2, the power supplied by the electrical source 40 will be proportional to the rate of movement of the contacts in the direction of the arrow.

In FIGURE 3 there is schematically depicted a contact arrangement generally designated by the reference numeral 45 useful in the apparatus and method of the present invention. The contact assembly 45 comprises a frame or support means 46 having first and second dependent legs 47 and 48, respectively. The legs 47 and 48 comprise electrically insulating portions 49 and 51, respectively, and electrically conductive portions 53 and 54, respectively. A fixed contact roll 55 is rotatably secured to the conductive portion 53 and generally adjacent the leg 48. The roll 55 beneficially is of copper and is in electrical contact with the conductive portion 53. A second contact roll 56 is disposed generally parallel to the first roll and remote from the frame 46. The roll 56 is adapted to rotate on a shaft 57 which is supported in a sliding bearing 58. The bearing 58 is slidably mounted on or within the conductive portion 53 and is resiliently tensioned to move in the direction indicated by the arrow. A resilient tensioning means 60 such as a spring serves to tension the bearing 58 in such a manner that the roll 57 is forced against the roll 55. A threaded member 62 passing through the conductive portion 53 provides a means of adjusting compressive force from the spring 60. The conductive portion 54 supports similar contact rolls 55a and 56a arranged in a like manner to the components 57, 58, 60 and 62. Such components are designated by the suffix a in FIGURE 3. Thus, two pairs of contact rolls are disposed within a space 63 defined between the dependent legs of the frame 46. A metal reinforcing element 64 is shown engaged by the rolls 55, 56, 55a and 56a. A first electrical power supply means or cable 66 is operatively connected to the conductive portion 53 and a second power supply means or cable 67 is connected to the conductive portion 54. Thus, an electrical current passing through the cables 66 and 67 is caused to flow through the reinforcing element 64.

In FIGURE 4 there is schematically represented a foam depositing apparatus in accordance with the invention generally designated by the reference numeral 70. The apparatus 70 comprises a housing 71. Dependent from the housing 71 is a first pair of guide and drive rolls 72 and a second pair of guide and drive rolls 73. A motor 74 rotates the guide and drive rolls in a direction indicated by the arrow. Third and fourth guide rolls not shown are disposed behind the first and second guide rolls and have substantially identical configuration. A first vertical support roll 75 is affixed to the housing 71 and adapted to engage an upper surface of a strip being joined to the structure. A second vertical support roll 76 is affixed remote from the roll 75 and also supports the housing 71. Mechanical details such as are contained in the housing are shown in U.S. Patent 3,206,899. A contact assembly 45a is essentially identical to the contact assembly 45 of FIGURE 3. A structure 77 is receiving a foam strip 78. A layer of expanded metal mesh 79 is disposed between the strip 78 and the structure 77. Electrical power is being applied to the mesh 79 by the contact assembly 45a as the housing travels continuously in the direction indicated by the straight arrow.

In FIGURE 5 there is schematically depicted an alternate foam depositing head in accordance with the present invention generally designated by the reference numeral 80. The foam depositing head 80 comprises a frame 81. A support member 82 is affixed to the frame 81 and adapted to engage a boom or other support means. The frame 81 defines a channel 84 through which foam elements being deposited are passed. The frame 81 supports electrical heating means 85 and 86. The electrical heating means 85 and 86 comprise a laminated core 87 and 87a of conventional transformer core stock. An electrical winding 88 and 88a is disposed about the portion of the cores 87 and 87a, respectively. Each of the cores 87 and 87a define a gap 89 and 89a. The gaps 89 and 89a within the cores 87 and 87a are adapted to pass a metallic reinforcing element 90. The metallic reinforcing element 90 is disposed between a foam strip 91 which is being deposited and a previously deposited foam strip 92.

In FIGURE 6 there is illustrated an induction heating coil 95 defining a centrally disposed space 96. A reinforcing element 97 is disposed within the space 96.

Beneficially, employing the embodiment of FIGURES 5 and 6 induction heating of the reinforcing element is readily accomplished and arcing at the contacts is avoided. Advantageously, wherein structures having relatively thin walls are readily heated employing only one induction coil, oftentimes it is advantageous to employ an induction coil disposed on either side of the reinforcing element in order to provide more uniform heating and minimize uneven melting of the joint. If space permits, the embodiment of FIGURE 6 may be employed. For example, a C-shaped laminated core having a configuration generally as illustrated in FIGURE 5 and having a cross-section of 2 inches by 2 inches wound with 275 turns of #15 wire rapidly heats a 6 inch diameter circle in hardware cloth, expanded metal lath, copper or aluminum sheet to provide melting and subsequent bonding of thermoplastic foam, e.g. polystyrene foam disposed in contact with and on either side of the metal. The induction coil requires 220 volts at 10 amps at 60 Hertz.

Employing the apparatus in accordance with the present invention, foam strips are readily secured to foam bodies to form a strong joint having a perforate metal reinforcement disposed within the joint. A wide variety of perforate metal reinforcements can be employed including expanded metal mesh of varying thickness depending on the specific need, wire cloth, perforate metal sheet and the like, depending on the specific requirements of the desired end product. The openings in the perforate reinforcement must be of sufficient size to permit flow of the melted foam material therethrough, otherwise satisfactory bonding of the foamed layers is not obtained. Generally, such openings should be at least about 0.3 inch wide. However, such dimensions are dependent upon the particular plastic material being used. The desirability of any given perforate reinforcement can readily be determined by passing a portion of the reinforcement on an upwardly facing surface of a foam body, heating the reinforcement to a temperature just sufficient to melt the thermoplastic foam and determining if the melted foam has penetrated at least about one third of the depth of the opening in the reinforcement.

Beneficially, reinforced structures are readily fabricated employing polystyrene foam, metal lath, expanded metal mesh, wire cloth having openings with a minimum dimension of 0.3 inch. Similar benefits are obtained using foamed nylon, foamed polyethylene and like thermoplastic resinous foamed compositions.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:

1. In an apparatus for the joining of synethic resinous bodies which comprises:
    a foam depositing head supported on a rotatable boom, the foam depositing head having,
    means to engage a formed foam structure, means to engage a foam strip being deposited on the formed structure, means to forward the foam depositing head at a predetermined rate, the improvement which comprises an electric heating means supported by and attached to the boom with the foam depositing head, the electric heating means adapted to energize the metallic element projecting on either side of the foam strip being deposited to heat the deposited foam strip and cause partial melting of the foam strip and bonding of adjacent portions thereof.

2. The apparatus of claim 1 wherein the means to electrically heat the metallic element comprises a pair of electrical contacts adapted to engage projecting edges of a metallic reinforcing element, the edges projecting on either side of the foam strip to be deposited.

3. The apparatus of claim 2 wherein the contact elements each comprise a pair of conductive rollers which are resiliently urged toward each other and thereby grasp opposed projecting edges of the reinforcing element.

4. The apparatus of claim 1 wherein the electrical heating means is an induction heating element.

5. The apparatus of claim 4 wherein the electrical heating means comprises an induction coil having a core, the core defining a gap, the gap receiving an edge of the metallic reinforcing element.

6. The apparatus of claim 5 having an induction coil adapted to supply heat to opposed edges of the reinforcing element.

References Cited

UNITED STATES PATENTS

| | | | |
|---|---|---|---|
| 1,335,453 | 3/1920 | Nilson | 219—10.79 |
| 2,372,929 | 4/1945 | Blessing | 219—10.53 |
| 2,378,801 | 6/1945 | Sidell et al. | 219—10.53 |
| 2,417,030 | 3/1947 | Wilson et al. | 219—10.61 |
| 2,572,226 | 10/1951 | Walstrom | 219—10.53 |
| 2,952,578 | 9/1960 | Carlson | 156—275 |
| 2,983,306 | 5/1961 | Resnick | 156—380 |
| 3,048,888 | 8/1962 | Shockley et al. | |
| 3,276,072 | 10/1966 | Politzer et al. | 156—275 |
| 3,206,899 | 9/1965 | Wright | 264—45 |

FOREIGN PATENTS 583,332  9/1959  Canada.

JOHN T. GOOLKASIAN, Primary Examiner

W. E. HOAG, Assistant Examiner

U.S. Cl. X.R.

156—499, 500, 275